United States Patent [19]
Parker

[11] Patent Number: 5,588,100
[45] Date of Patent: Dec. 24, 1996

[54] METHOD AND SYSTEM FOR CREATING A FREEFORM DRAWING OBJECT

[75] Inventor: David C. Parker, Menlo Park, Calif.

[73] Assignee: Microsoft Corporation, Redmond, Wash.

[21] Appl. No.: 884,392

[22] Filed: May 18, 1992

[51] Int. Cl.$^6$ .................................................... G06F 15/00
[52] U.S. Cl. ............................................................ 395/142
[58] Field of Search ............................... 395/155, 161, 395/140, 142, 143; 340/703, 732, 734; 345/135, 136, 163, 164, 165, 166, 157, 158, 161, 162

[56] References Cited

U.S. PATENT DOCUMENTS

| | | | |
|---|---|---|---|
| 5,113,517 | 5/1992 | Beard et al. | 364/200 |
| 5,121,470 | 6/1992 | Trautman | 395/140 |
| 5,182,796 | 1/1993 | Shibayama et al. | 395/156 |
| 5,339,389 | 8/1994 | Bates et al. | 395/153 |

OTHER PUBLICATIONS

"Bezigon Tool," *MacDraw Pro User's Guide*, ©1991 Claris Corp.

*Primary Examiner*—Phu K. Nguyen
*Attorney, Agent, or Firm*—Seed and Berry LLP

[57] ABSTRACT

A method and system for creating a freeform drawing object having any desired combination of polygonal and freehand segments. In a preferred embodiment, at any time during creation of the freeform drawing object, a polygonal segment is created by releasing a mouse at a polygonal cursor start point and then depressing it at a polygonal segment end point, and a freehand segment is created by dragging the mouse from a freehand cursor start point to a freehand cursor end point. Interpretation of whether a depress-move-release sequence should be considered a drag is based on the amount of time the mouse button is held down before being released. Any combination of polygonal and freehand segments is thus provided until the freeform object is completed by double clicking the mouse or by clicking the mouse at a cursor location within a predetermined distance from an original cursor point. During the creation of a polygonal segment a polygonal cursor is displayed and a straight rubber band line is drawn from the starting to current cursor location. During the creation of a freehand segment a freehand cursor is displayed which differs in appearance from the polygonal cursor, and a solid line is drawn along the cursor path.

26 Claims, 11 Drawing Sheets

METHOD AND SYSTEM FOR CREATING A FREEFORM DRAWING OBJECT

TECHNICAL FIELD

The present invention relates generally to the field of mouse-driven computer graphics and, more specifically, to a method and system for creating a freeform drawing object having any desired combination of polygonal and freehand segments.

BACKGROUND OF THE INVENTION

Figure 1A:
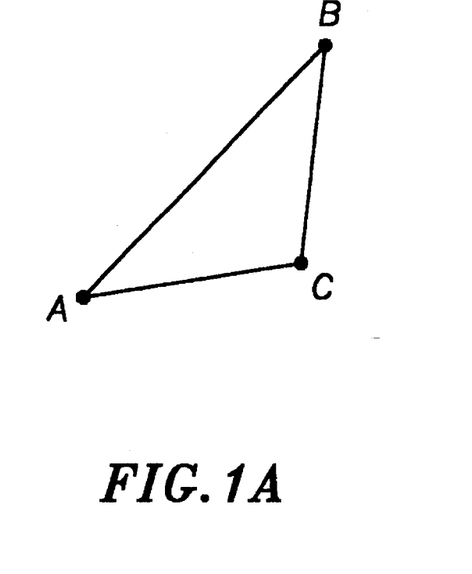
FIG. 1A is man example of a polygonal drawing object that can be created on a computer graphics system.
Figure 1B:
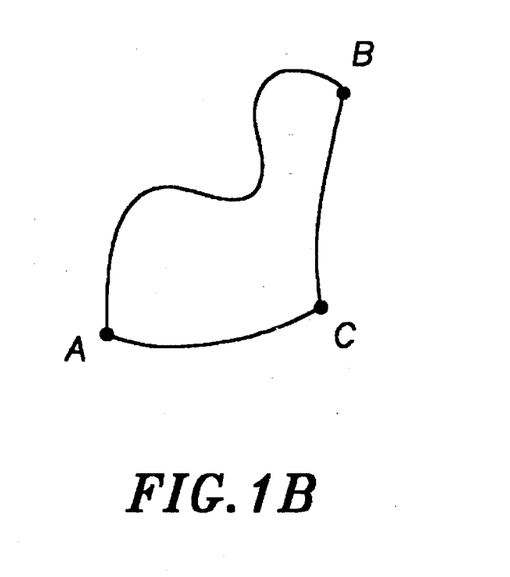
FIG. 1B is an example of a freehand drawing object that can be created computer on a graphics system.

Traditional drawing programs provide the capability of creating polygonal objects made up of straight line segments, such as the polygon that is illustrated in FIG. 1A. These and other drawing programs may also provide the capability of creating freehand objects made up of one or more potentially curry freehand segments, such as the freehand object shown in FIG. 1B. Conventionally, in a system that allows either type of object, to create a polygonal object the user must select a polygonal object mode, and to create a freehand object the user must select a freehand object mode.

In such a conventional environment, however, it has typically not been possible to create a "freeform" object. A freeform object is defined herein to refer to an object which is a mixture of both straight line polygonal segments and curvy line freehand segments, such as that shown in FIG. 5. This is because, in a traditional cursor-driven computer graphics system, the system must be able to determine whether to interpret mouse movement between two points as an attempt to create either a polygonal segment or a freehand segment. For example, in polygonal object mode, the computer graphics system interprets the mouse movement shown in FIG. 2 as a request to draw straight lines between the beginning and ending cursor positions. Accordingly, a computer graphics system would create straight line polygonal segments to form a polygonal object shown in FIG. 1A.

Figure 2:
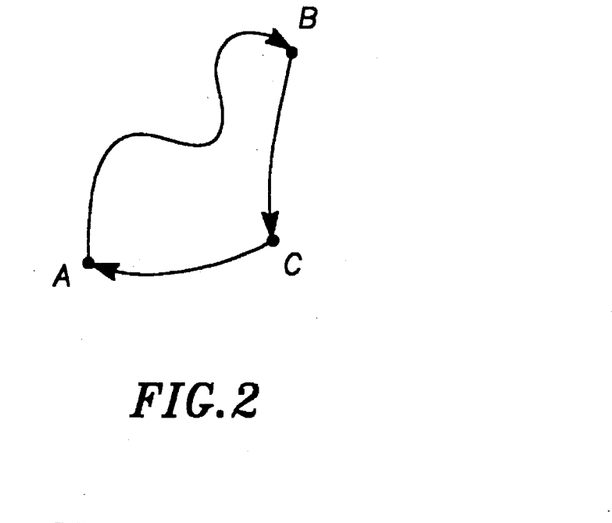
FIG. 2 is a diagram showing cursor movement obtained via user input from a mouse to create the polygonal object in FIG. 1A ( in a conventional polygonal mode) or the freehand object in FIG. 1B (in the conventional freehand mode).

Alternatively, a freehand object mode has been necessary for the computer graphics system to interpret a mouse movement such as that shown in FIG. 2 as a request to draw a curvy line along the approximate path of the cursor movement. Accordingly, the computer graphics system would create curvy segments corresponding to the cursor movement to create the freehand object shown in FIG. 1B.

Thus, computer graphics systems conventionally require that either a polygonal or freehand mode be designated for the creation of an entire object. In such a system, freeform data objects made up of a mixture of polygonal and freehand segments, such as that shown in FIG. 5, could not be created. The freeform object in FIG. 5 includes both polygonal segments 502, 504 and freehand segments 506, 508 in the same drawing object.

Figure 5:
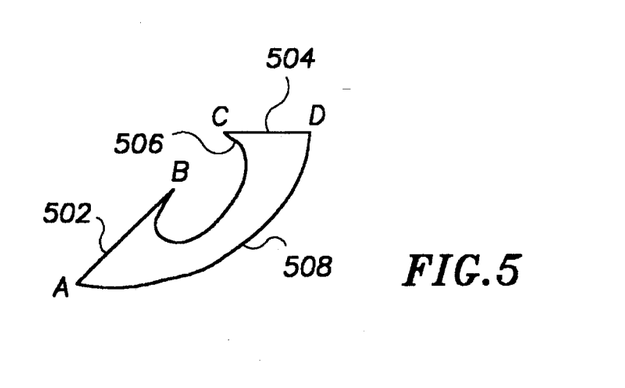
FIG. 5 is an illustration of a freeform drawing object containing both polygonal and freehand segments, which is obtainable by the present invention.

Although a user might emulate the shape shown in FIG. 5 by creating multiple objects separately, such as polylines 502, 504 in polygonal mode, and freehand lines 506, 508 in freehand mode, the resulting shape would not, without some form of additional and time-consuming manipulation, take on the characteristics normally attributable to a single graphic data object. The capability of treating a shape as a single data object is, of course, a valuable computer graphics application. For example, a shape when treated as a single object can be filled, moved or sized as an entity. Further, it is important to obtain the graphic data object quickly and efficiently, within a continuous mode. Therefore, the instantaneous combination, within a continuous mode, of polygonal and freehand segments in a single drawing object, is a desirable feature in a computer graphics system.

SUMMARY OF THE INVENTION

An object of the present invention is to provide a method and system for drawing freeform objects made up of any desired combination of polygonal and freehand segments.

Another object of the present invention is to provide such a method and system in which the polygonal and freehand segments are created and specified solely through user control of a user positioning device such as a mouse, and in one continuous mode.

These and other objects, which will become apparent as the invention is more fully described below, are obtained by a method and system for creating, in accordance with user input via a user positioning device, a freeform drawing object having any desired combination of polygonal and freehand segments. A polygonal segment is created between selected points when the user input specifies that a polygonal segment is to be created, and a freehand segment is created between selected points when the user input specifies that a freehand segment is to be created. The method or system continues to create polygonal or freehand segments in accordance with the user input, until the user input specifies that the freeform drawing object has been defined.

In a preferred embodiment, at any time during creation of the freeform drawing object, a polygonal segment is created by releasing a mouse at a polygonal cursor start point and then depressing it at a polygonal cursor end point, and a freehand segment is created by dragging the mouse from a freehand cursor start point to a freehand cursor end point. Interpretation of whether to start a freehand segment is based on the amount of time the mouse button is held down before being released. Any combination of polygonal and freehand segments is thus provided until the freeform object is completed by double-clicking the mouse or by clicking the mouse at a cursor location within a predetermined distance from an original cursor point. During the creation of a polygonal segment, a polygonal cursor is displayed, and during the creation of a freehand segment, a freehand cursor is displayed which differs in appearance from the polygonal cursor. Also, a polygonal segment is previewed with feedback in the form of a moving "rubber band" line and a freehand segment is drawn as it appears.

DETAILED DESCRIPTION OF THE INVENTION

In the present invention, a freeform drawing object can be created in accordance with user input via a user positioning device, such as a mouse, pen or other equivalent positioning devices. Although a mouse is described in the preferred embodiment, it should be understood that any such positioning device could be similarly provided to perform the same function. The invention is a "freeform tool" that implements a freeform user interface, and creates a polygonal segment when a user operates the user positioning device in a predefined way to specify that a polygonal segment is to be created. Similarly, the invention creates a freehand segment when the user operates the user positioning device to specify that a freehand segment is to be created. The invention creates any number of polygonal and freehand segments in this fashion, until the user specifies via the user positioning device that a freeform drawing object has been defined.

Although in the preferred embodiment a mouse is provided as the user positioning device, it should be apparent that one of ordinary skill in the art could provide alternative devices for accomplishing this function.

One way of providing such a system might include the use of keyboard input by which a user would specify the type of segment to be created in tandem with mouse control of the cursor to designate the segments. However, some computer graphics systems do not include keyboards, and thus a keyboard-oriented method or system could not be implemented on such a computer graphics system. Further, even on a system with a keyboard, any divergence of the user's attention away from a single unit, such as the mouse, can be distracting, and thus render the mouse incapable of providing some of its own primary advantages, such as allowing the user to maintain uninterrupted visual concentration on the display screen and to control the drawing process with only one hand. Also, utilizing the keyboard would potentially limit or replace other functions implemented on the keyboard.

Thus, in the preferred embodiment of the present invention, a single user positioning device, i.e. a mouse, is provided with which the user can specify polygonal and freehand segments. In general, the preferred embodiment operates as follows:

1. The Freeform tool creation process is first set in motion by the user selecting a Freeform tool application from within the computer graphics system. For example, the user controls a mouse to position the cursor at a displayed Freeform tool selection area and then depresses the mouse button to select the Freeform tool application.

2. The user controls the mouse to move the cursor to the location of the first desired point on the freeform drawing object and depresses the mouse at that point.

3. The user adds any number and combination of polygonal and freehand segments as follows:

a. Polygon segments are added by releasing the mouse at the start point and depressing it at the end point of the segment. The user releases the mouse at the start point and then moves the cursor to the desired end point of the segment and depresses the mouse button. At this time, a straight line is drawn between the start point and the end point.

b. Freehand segments are added by "dragging" the mouse from a start point to an end point. The mouse is dragged by the user moving the mouse while the button is depressed. With the cursor at the start point, the user moves the cursor along the path of the freehand segment to the end point, and releases the mouse button. During this time, the freehand segment is drawn along the path of the cursor from the start point to the end point, following the path of the mouse. If the duration of the drag is not at least a predetermined time, however, the drag will be ignored and no freehand segment will be drawn.

4. The freeform drawing object is terminated by either clicking the mouse near an original point (the first point selected in creating the freeform drawing object) or by double-clicking the mouse at the last desired point on the object, the former creating a closed "loop" of segments, and the latter an open sequence of segments. Clicking of the mouse is determined not to be a drag defining a new freeform drawing object, when the mouse is released within the predetermined time after its depression.

By utilizing the above basic process, a user can create, without diverting attention away from the display, open or closed polygonal objects or freehand objects as traditionally available, and also freeform drawing objects having a combination of polygonal and freehand segments, as was not possible in the prior art.

Figure 10A:
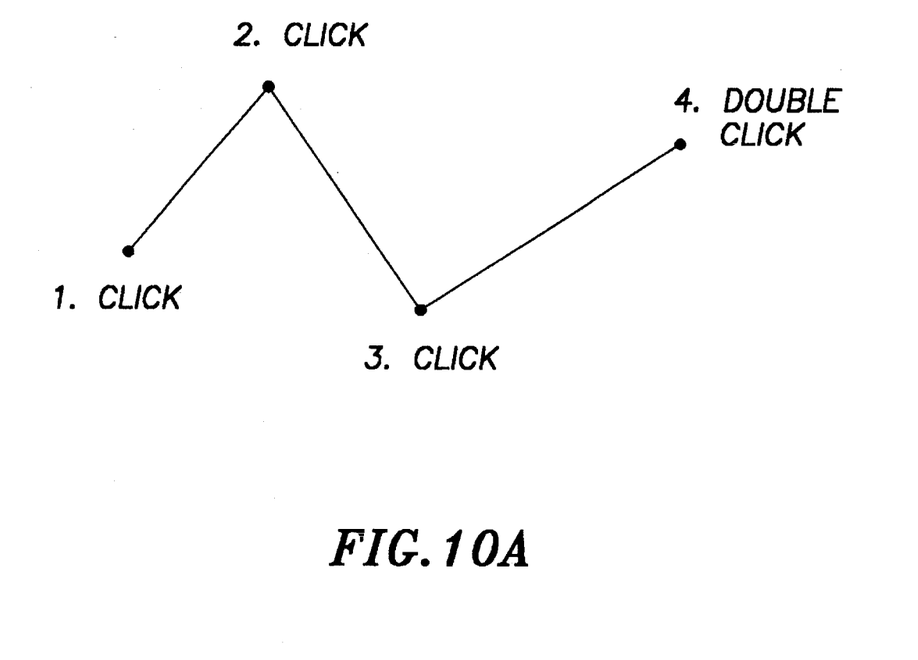
FIG. 10A is an example of a traditional polyline as created by the Freeform tool.
Figure 10B:
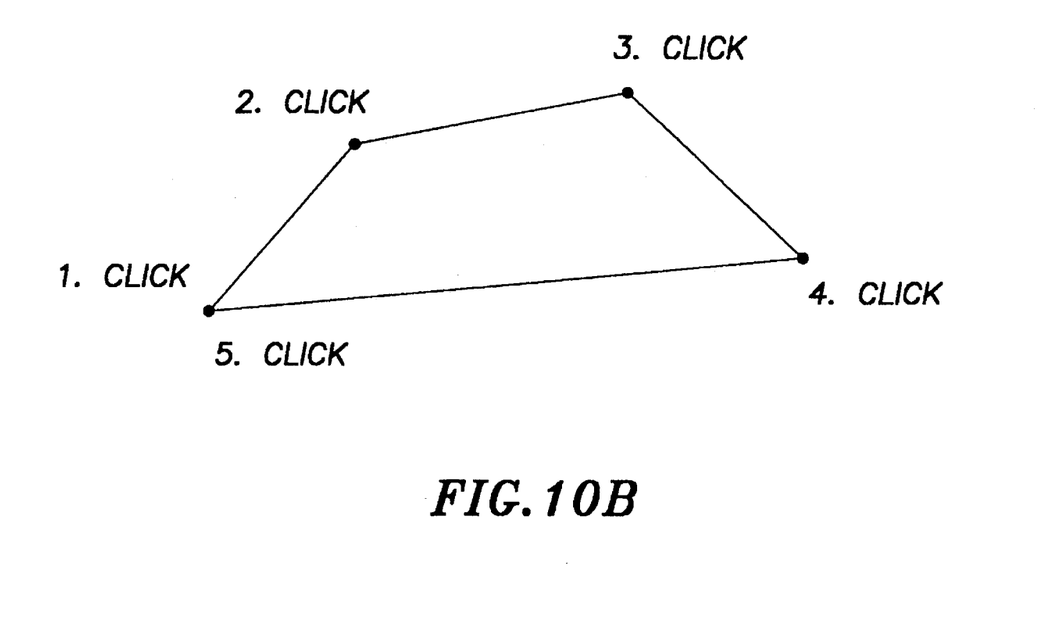
FIG. 10B is an example of a traditional polygon as created by the Freeform tool.

For example, a traditional open polyline can be created with the Freeform tool as shown in FIG. 10A, by clicking (depressing then releasing) the mouse at the first, second and third points as shown, and double-clicking at the fourth point as shown. Similarly, a traditional closed polygon can be created with the Freeform tool as shown in FIG. 10B, by clicking the mouse at the first, second, third and fourth points as shown, and clicking the mouse at the fifth point which is very near the original first point selected.

Figure 11A:
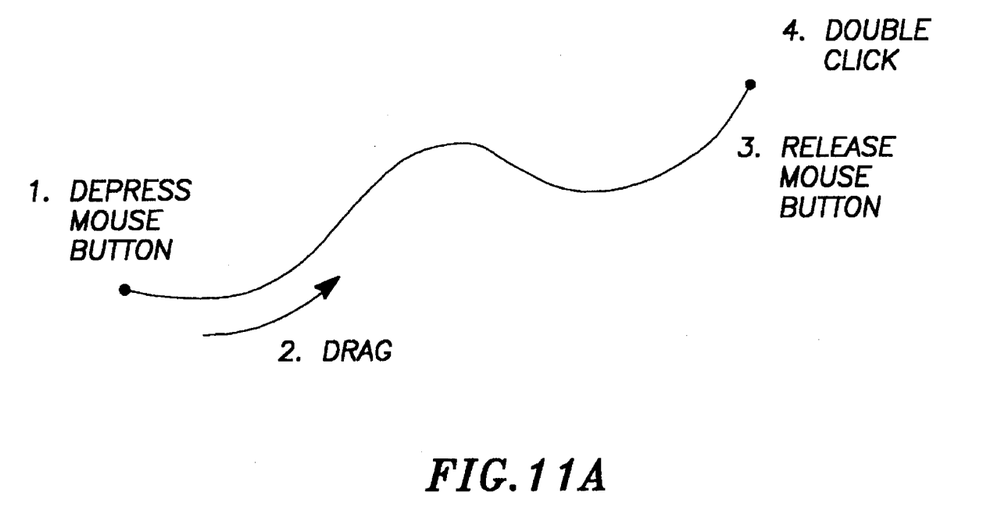
FIG. 11A is an example of a traditional open freehand object as created by the Freeform tool.
Figure 11B:
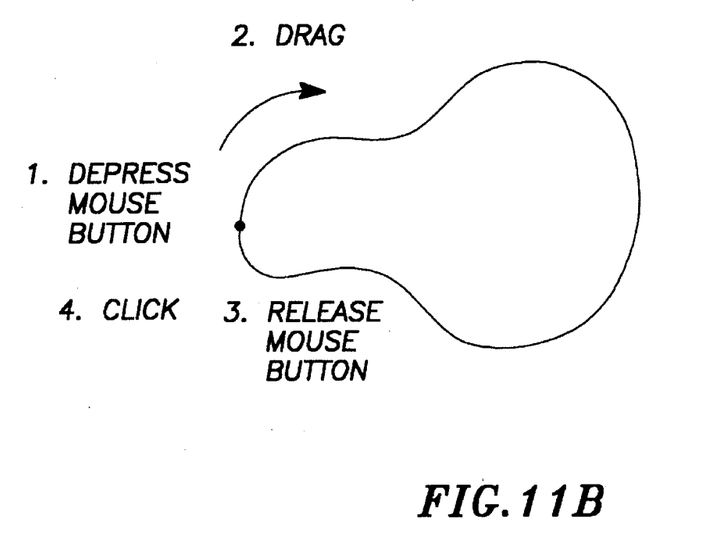
FIG. 11B is an example of a traditional closed freehand object as created by the Freeform tool.

A traditional open freehand object can be created with the Freeform tool as shown in FIG. 11A, by firstly depressing the mouse button, secondly moving the cursor along a desired path, thirdly releasing the mouse button, and fourthly double clicking the mouse, as shown. A traditional closed freehand object can be created as shown in FIG. 11B, by firstly depressing the mouse button, secondly dragging the mouse along the freehand path and back to the original point, thirdly releasing the mouse button, then clicking very near the original point.

Figure 12A:
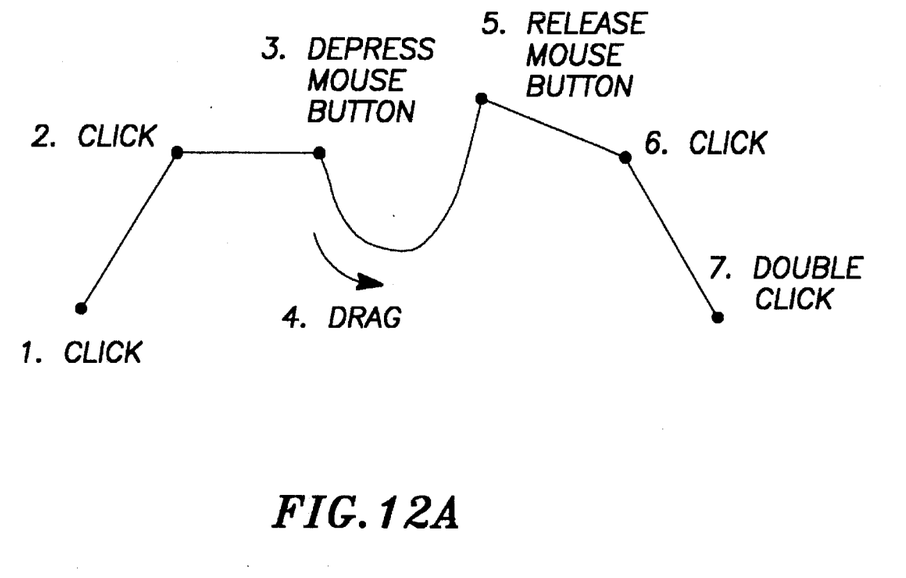
FIG. 12A is an example of a mixed polyline/freehand freeform object as created by the Freeform tool.

A freeform drawing object having both polygonal and freehand segments can be created with the Freeform tool in the present invention, as discussed above. For example, an open mixed polyline/freehand freeform object as shown in FIG. 12A can be created by firstly clicking (depressing and releasing within a predetermined time) the mouse at an original point, secondly clicking the mouse after moving the cursor to a new point, thirdly depressing the mouse button, fourthly dragging (depressing for beyond a predetermined time) the mouse by moving the cursor with the mouse button depressed, fifthly releasing the mouse button, sixthly clicking the mouse after moving the cursor to a new point, and, seventhly, double-clicking the mouse at a final point.

Figure 12B:
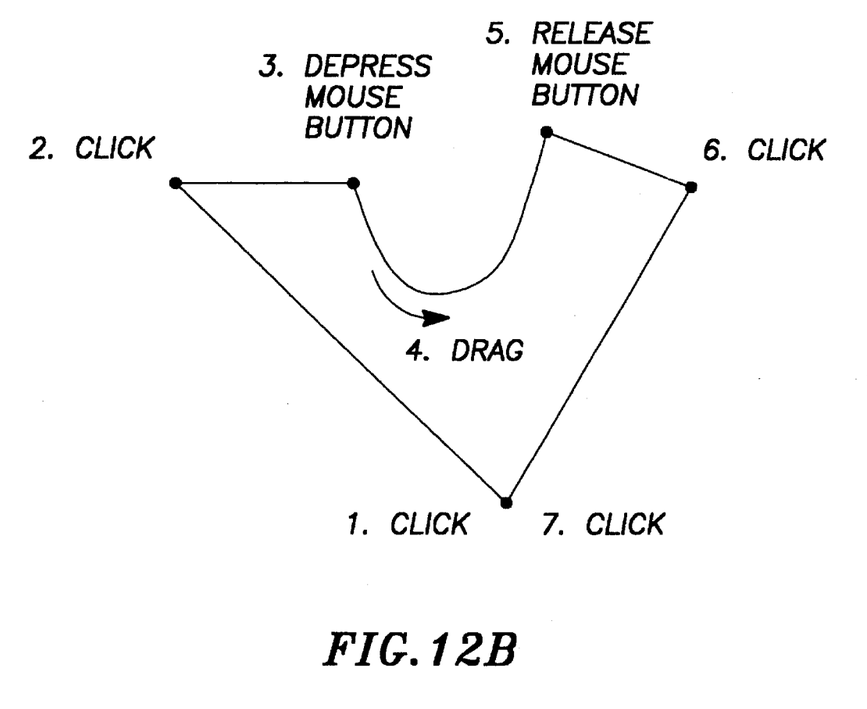
FIG. 12B is an example of a mixed polygon/freehand freeform object as created by the Freeform tool.

Similarly, a closed mixed polygon/freehand freeform object as shown in FIG. 12B can be created by firstly clicking the mouse at an original point, secondly clicking the mouse after moving the cursor to a new point, thirdly depressing the mouse button after moving the cursor to a new point, fourthly dragging (depressing for beyond a predetermined time) the mouse to a new point, fifthly releasing the mouse button, sixthly clicking the mouse at a new point, and then seventhly clicking the mouse at a final point near the original point.

Because the resulting freeform drawing object takes on the characteristics of a single data object in the computer graphics system, it can be treated as such regardless of the combination of polygonal and freehand segments therein.

The preferred embodiment is described below as implemented in a Freeform tool user interface within a computer graphics system on an IBM PC or compatible computer system with a mouse and mouse driver, a display and a graphics adapter.

Figure 3:
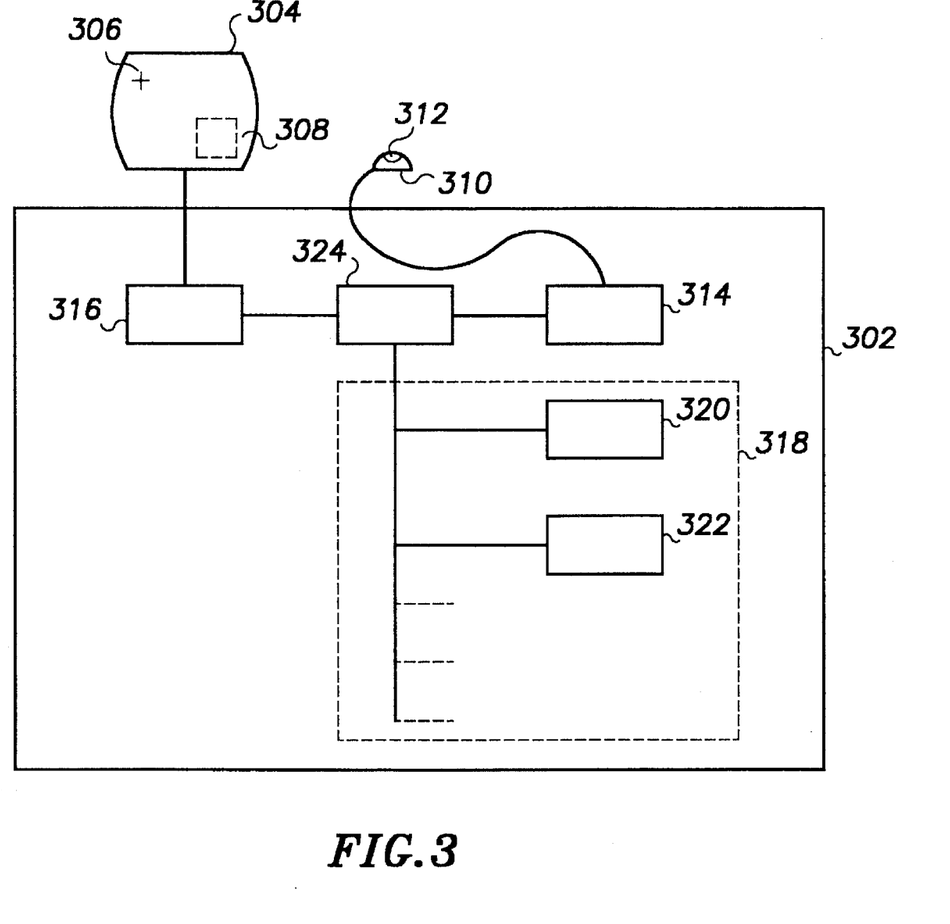
FIG. 3 is a diagram of a computer graphics system that is utilized in a preferred embodiment of the present invention.

In FIG. 3, a computer graphics system is shown which is capable of implementing the Freeform tool user interface in accordance with the preferred embodiment of the present invention. A computer 302, such as an IBM PC or compatible, is provided with a display 304 such as a conventional CRT display monitor. The display 304 displays a cursor 306 movable about the display 304, and also displays a Freeform tool selection area 308 at a designated location of the display 304. A mouse 310 is connected to the computer 302 to control movement of the cursor 306 on the display 304. The mouse 310 can be any conventional mouse unit that has a mouse button 312 by which to send a MOUSE DOWN signal to the CPU upon depression of the mouse button 312 and a MOUSE UP signal upon release of the mouse button 312. The mouse 310 is used to select coordinates of the cursor 306 on the display 304 via a mouse driver 314 and the computer 302.

The computer 302 implements conventional computer graphics software which is capable of performing basic graphic functions such as location and movement of the cursor 306, plotting points on the display 304, plotting lines between points on the display 304, filling in drawing objects such as polygons, etc, in accordance with the input of a user.

For example, the computer 302 implements a user interface program in accordance with the present invention to utilize the conventional computer graphics software. The graphics adapter 316 receives input from the user interface program 324 and provides display output to the display 304, in accordance with communication with a conventional graphics software package 318. It should be understood that the basic computer graphics control functions provided by the conventional software package 318 could be provided by a variety of different software or hardware sources that could readily be utilized by one of ordinary skill in the art.

The software package 318 includes, along with other software for realizing computer graphics capabilities, a point plot software routine 320 which provides the capability of plotting a point on the display 304 in accordance with specified coordinates, and a line draw software routine 322 which provides the capability of plotting a straight line on the display 304 between two points represented by specified coordinates.

The freeform user interface program 324 provides the present invention with the capability of creating a freeform drawing object such as the one shown in FIG. 5, by interfacing with the user to obtain, at any time during the creation of a drawing object, the type of segment currently desired by the user.

Figure 4:
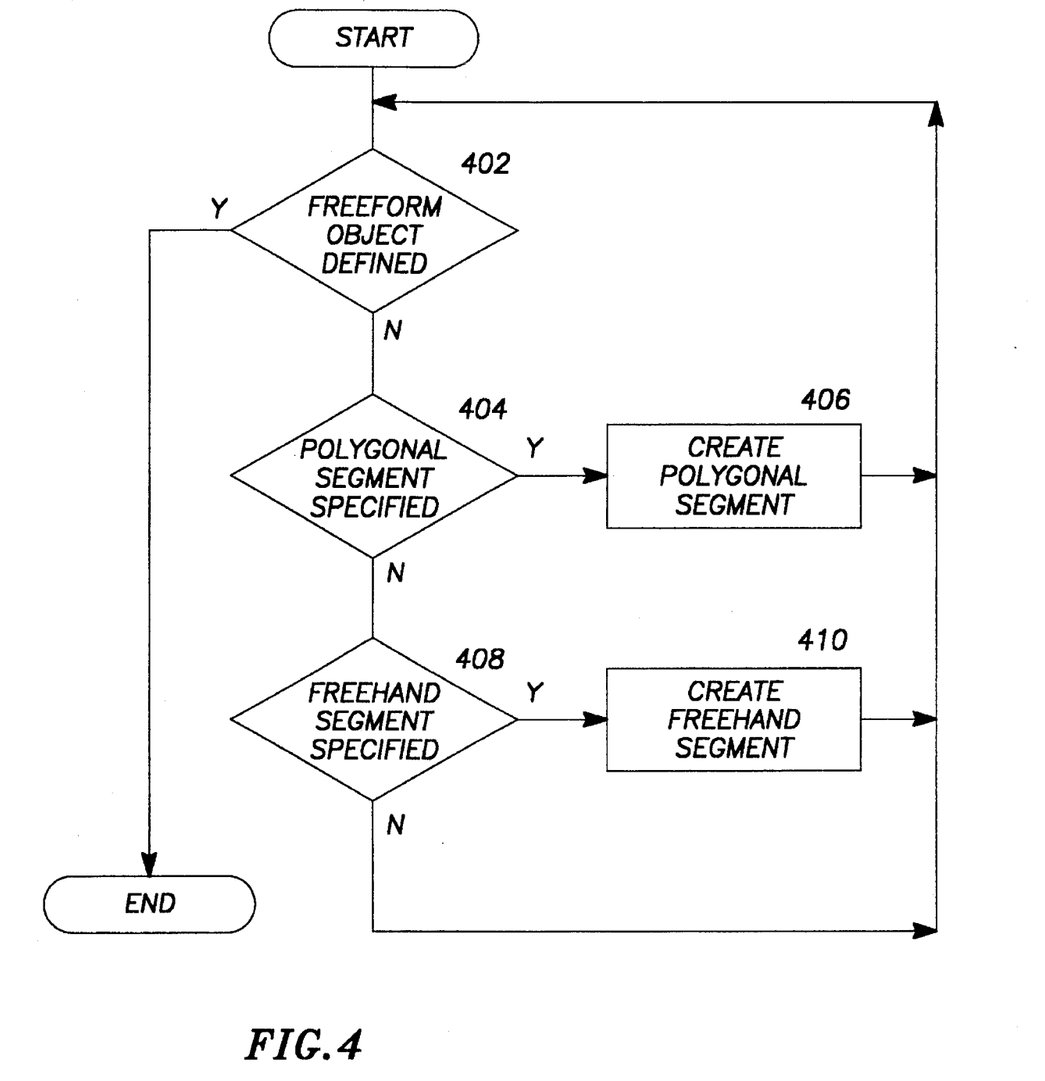
FIG. 4 is a high-level flow diagram of the user interface program in accordance with preferred embodiment of the present invention.

As shown in FIG. 4, the freeform user interface program 324, after checking in step 402 whether the freeform object has been defined, continually creates new segments as specified by the user. In step 404 the user interface program determines whether a polygonal segment has been requested and, if so, creates a polygonal segment in step 406. If not, in step 408 the user interface program determines whether a freehand segment has been requested and, if so, creates a freehand segment. Control loops to continually check for the completion of the freeform object and new segments to add.

In a preferred embodiment of the present invention, the freeform user interface program 324 distinguishes between a request to create a polygonal segment and a request to create a freeform segment based on whether the mouse button is depressed or not. In addition, a timer is used to delay determination of a drag so that accidental movement during a "click" will not result in unwanted freehand segments. The difference between a click and a drag is recognized by the freeform computer interface 324 based on the amount of time between a MOUSE DOWN signal sent by the mouse 310 upon depression of the mouse button 312 and a MOUSE UP signal sent by the mouse 310 upon release of the mouse button 312. If this time interval exceeds a predetermined length of time, the user input is interpreted as a drag and a freehand segment is drawn. Otherwise the user input is interpreted as a click separating two polygonal segments, and subsequent cursor movement does not establish a freehand segment but indicates the location of the next polygonal segment point. A time of 200 milliseconds has been found to best represent this determination.

Figure 6A:
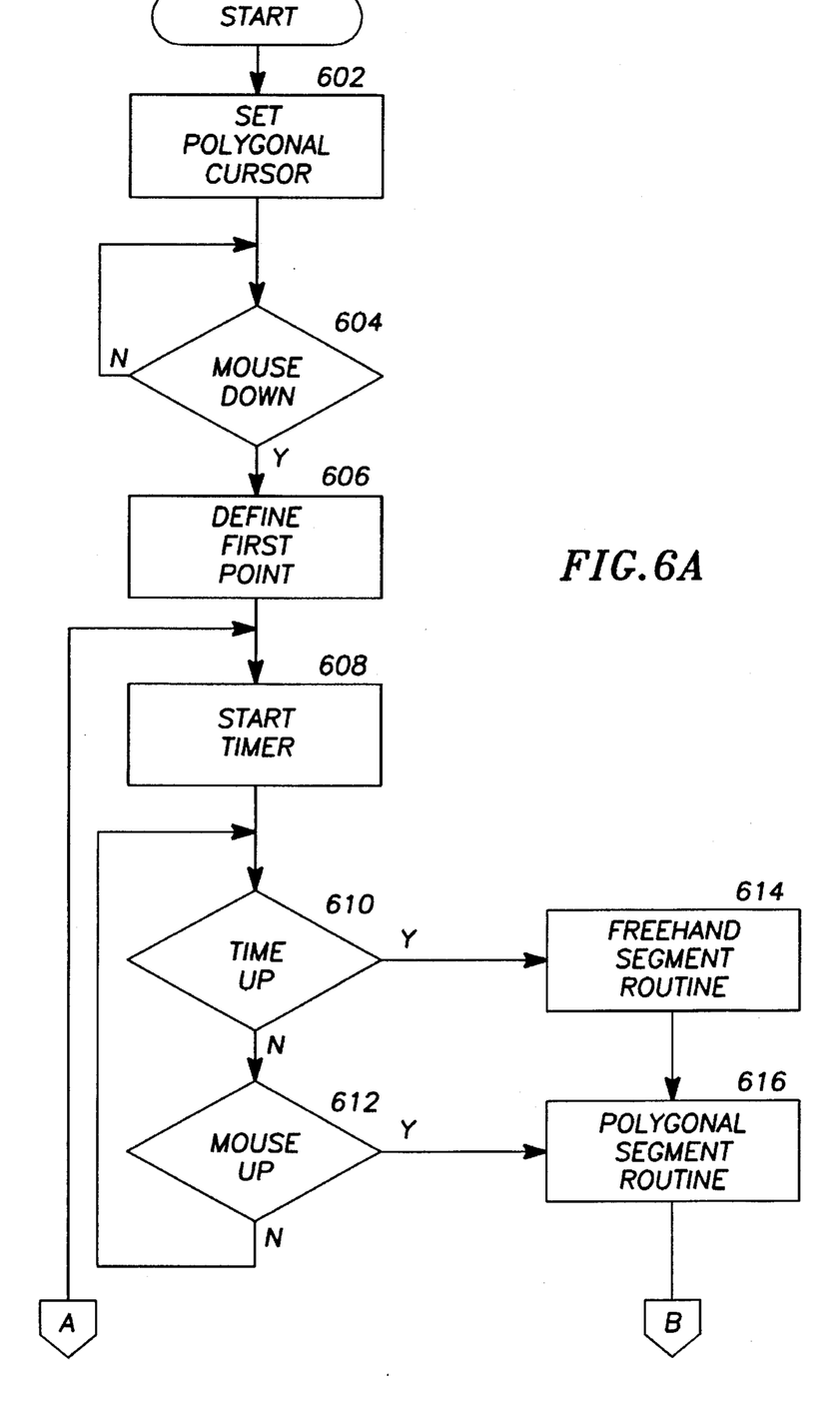
FIGS. 6A–6B are the flow diagram of a program to control the freeform user interface according to a preferred embodiment of the present invention.
Figure 6B:
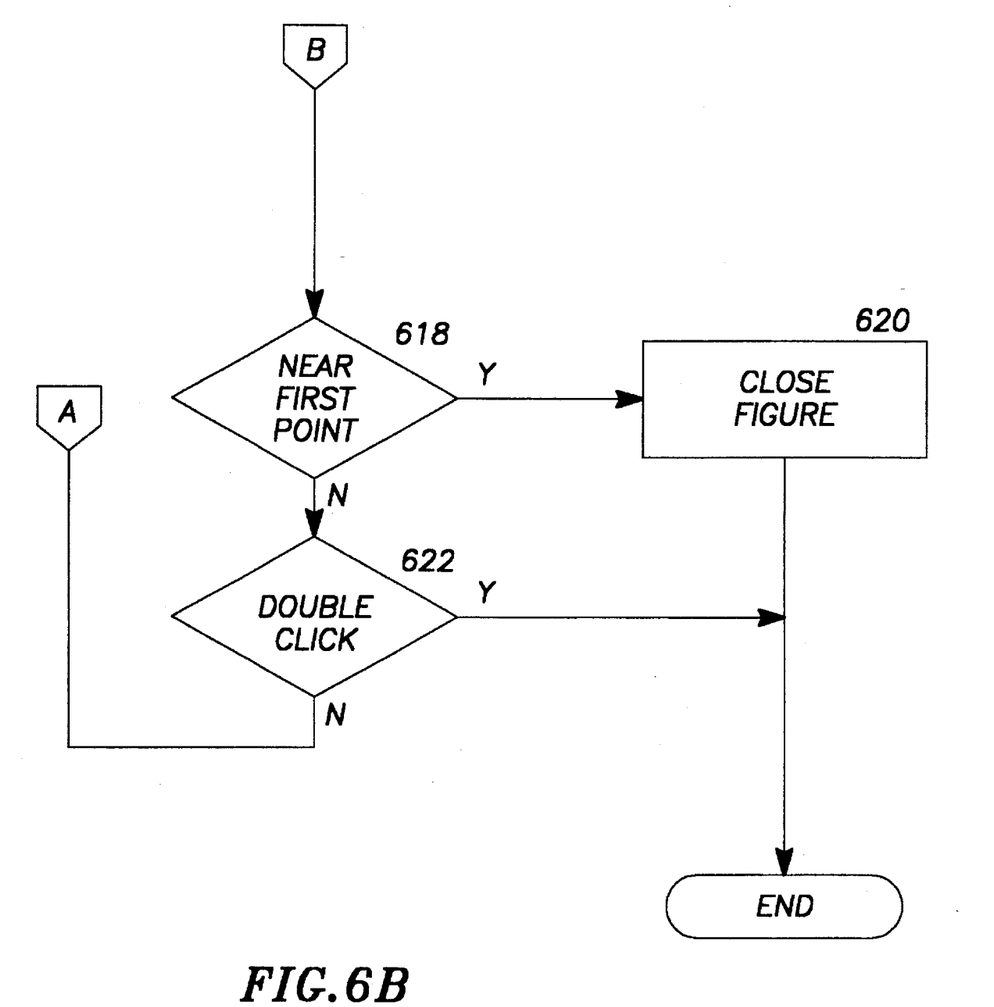

A flow diagram of operation of the freeform user interface is shown in FIG. 6. Upon a request by the user to create a freeform drawing object, which is preferably accomplished by positioning the cursor 306 upon the desired location within the Freeform tool selection area 308 on the display 304 and pressing the mouse button 312, the process shown in FIG. 6 is performed. In step 602, the polygonal cursor is initially set. In step 604, the freeform user interface 324 determines whether a MOUSE DOWN signal has been received. Control loops to repeat step 604 until the MOUSE DOWN signal is received, to indicate that the user wishes to draw a graphic data object. Once the MOUSE DOWN signal is received, the first point (original point) of the graphic data object is defined in step 606, and a timer is started in step 608.

The timer is based on a clock provided in the computer 302, and measures the length of time the mouse button 312 stays depressed. The time started, the freeform user interface 324 continually checks whether the timer has expired in step 610, and whether a MOUSE UP signal has been received in step 612. If neither has occurred, control loops to repeat steps 610 and 612. If the timer expires in step 610 before a MOUSE UP signal is received, a freehand segment routine is executed in step 614. If, however, a MOUSE UP signal is received before the time expires, indicating that the mouse button 312 was released very shortly after being depressed, a polygonal segment routine is executed in step 616. The freehand and polygonal segment routines 614 and 616 are described in greater detail in FIGS. 7 and 8.

Once a segment has been drawn by either the freehand or polygonal segment routine, the freeform user interface 324 determines in step 618 whether the segment was ended near (within a predetermined distance from) the first point selected. If so, a closed freeform data object is created in step 620 and drawing of the freeform data object is terminated. If not, the freeform user interface determines whether the segment was ended by a double click (two successive depression-releases of the mouse button 312, each within a predetermined time period). If so, drawing of the freeform data object is terminated. If not, control loops to step 608, and more segments are drawn.

Figure 7:
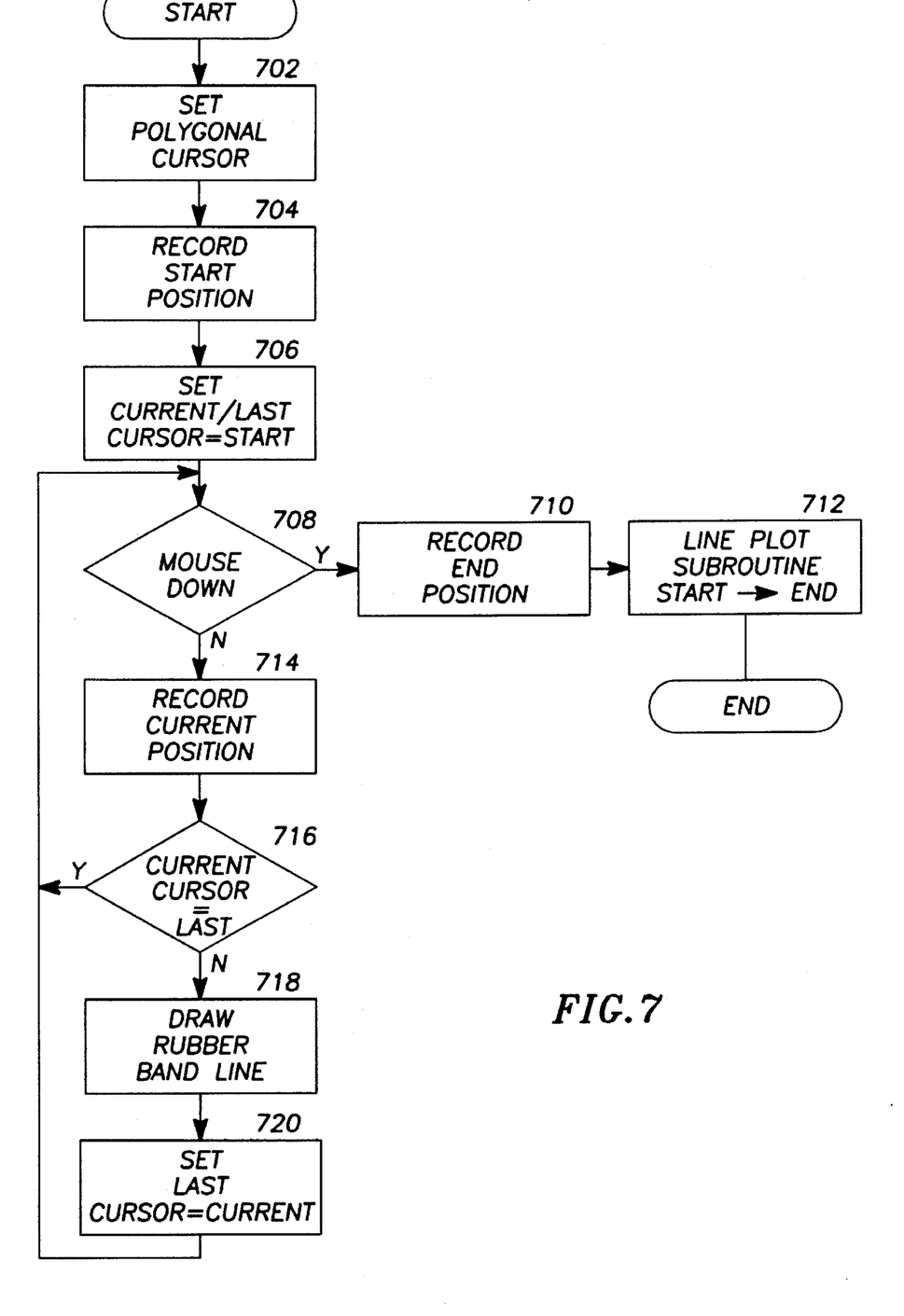
FIG. 7 is a flow diagram of the subroutine performed by the freeform user interface for polygonal segments.
Figure 9A:
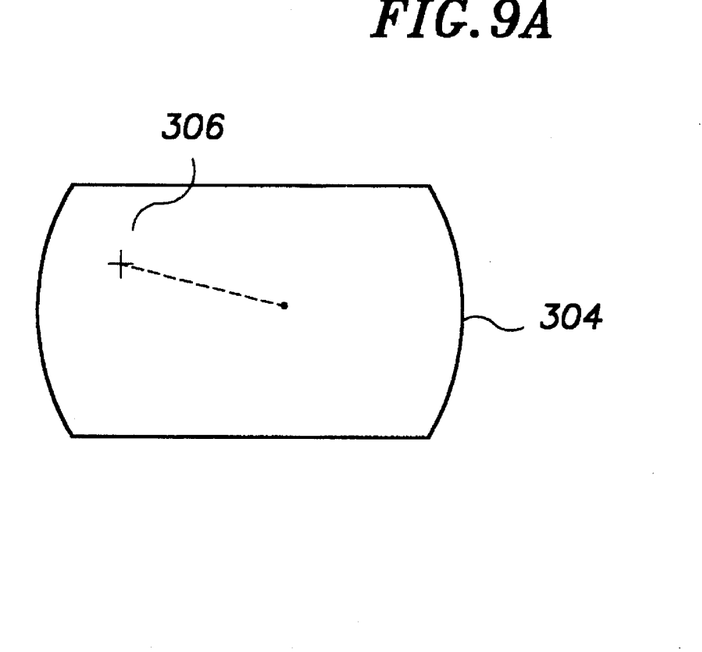
FIG. 9 illustrates a cursor indicating that a polygonal segment is being created.

A flow diagram of the polygonal segment subroutine is shown in FIG. 7, as implemented when the user wishes to draw a polygonal segment. In step 702, the polygonal segment subroutine sets the cursor to a polygonal cursor as shown in FIG. 9A, to indicate to the user that a polygonal segment is being drawn. In step 704, the click routine records the coordinates of the beginning location of the cursor to designate a start position of the polygonal segment.

In step 706, the current and last cursor position are set to the start position. In step 708, the polygon segment subroutine determines whether the user has depressed the mouse button 312 to terminate the segment, by checking whether a MOUSE DOWN signal has been received. If so, the end position is recorded in step 710 and a conventional straight line plot routine, provided within the conventional graphics software package 318, is executed in step 712 to plot a straight line from the start position to the end position.

If the MOUSE DOWN signal has not been received in step 708, the current position is first recorded in step 714 and compared to the last position in step 716 to determine whether the cursor has been moved. If not, control returns to step 708. If the cursor has moved, however, a rubber band line is drawn in step 718 to the current position, and the last position is set to the current position in step 720. The control returns to step 708.

Figure 8:
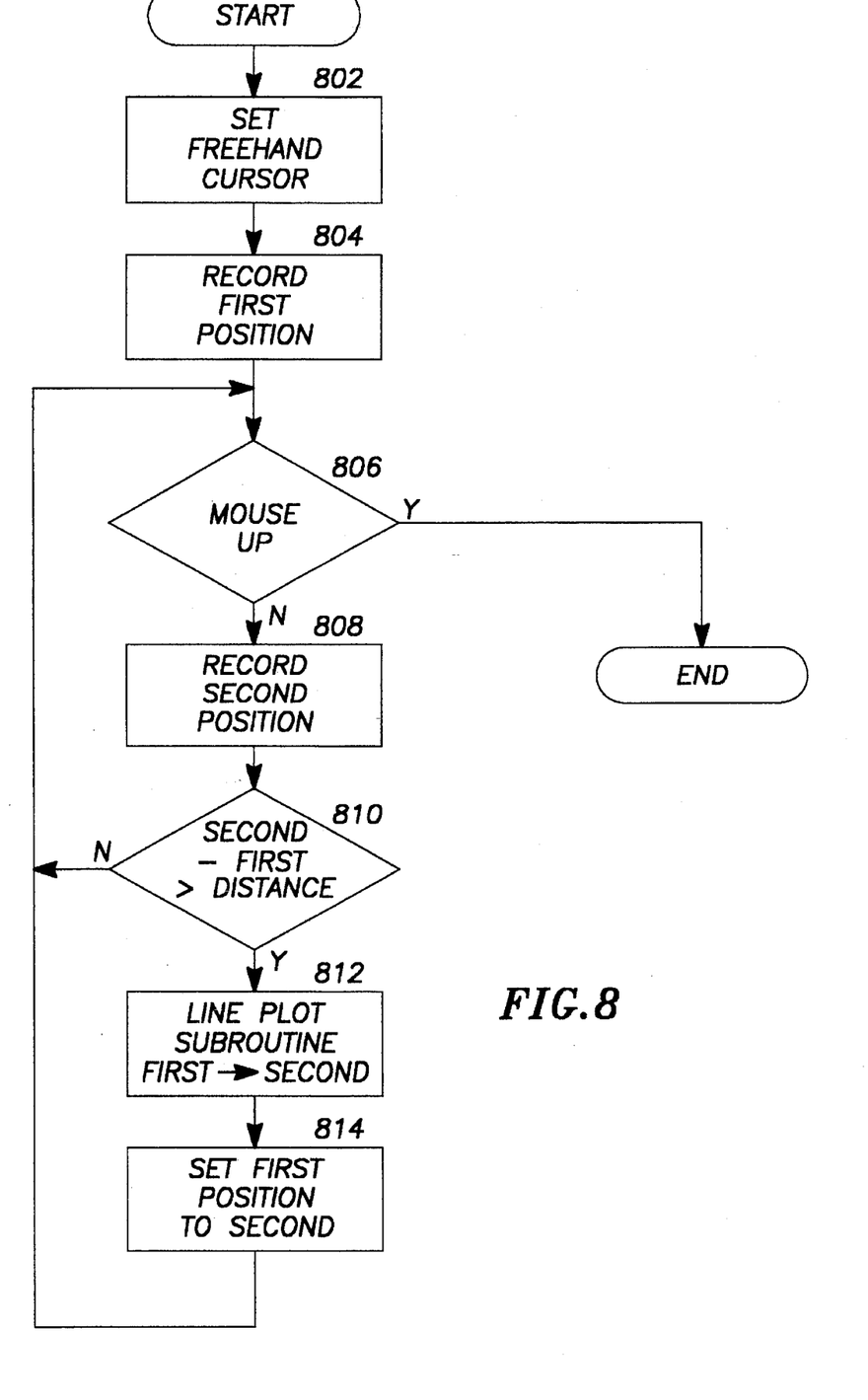
FIG. 8 is a flow diagram of the subroutine performed by the freeform user interface for freehand segments.
Figure 9B:
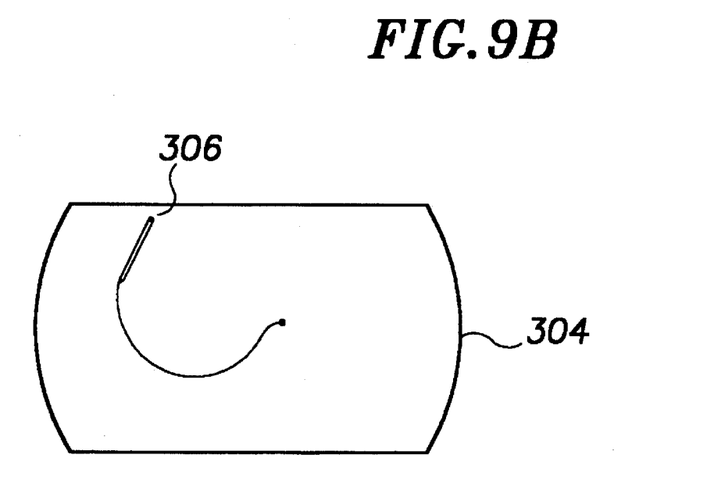
FIG. 9B illustrates a cursor indicating that a freehand segment is being created.

A flow diagram of the freehand segment subroutine is shown in FIG. 8, as implemented when the user wishes to draw a freehand segment. In step 802, the drag routine sets the cursor to a freehand cursor as shown in FIG. 9B to indicate to the user that a freehand segment is being drawn. In step 804, the drag routine records the coordinates of the first cursor location to designate the first cursor position from which the user desires to draw.

In step 806, the freehand segment subroutine determines whether the user has released the mouse button 312 to terminate the segment, by checking whether a MOUSE UP signal has been received. If so, the segment is complete and the subroutine ends. If not, a second cursor position is recorded in step 808. If in step 810 the freehand segment subroutine determines that the second cursor position is not more than a predetermined distance from the first cursor position, control returns to step 806.

Whenever the second cursor position has been moved beyond the first cursor position by more than the predetermined distance, the straight line plot routine in the conventional graphics software package 318 is executed in step 812 to plot a short straight line from the first cursor position to the second cursor position. In step 814, the first cursor position is reset to the second cursor position, and control returns to step 806.

It should be noted that, although in the present embodiment the freehand segment is obtained by approximating the movement of the cursor with short polygonal segments as described above, the freehand segment could also readily be obtained by one of ordinary skill in the art based on point plotting, existing methods of spline creation, etc.

In the preferred embodiment of the present invention, feedback is provided to inform the user of the type of segment that is being created. This feedback is provided by displaying a different cursor depending on whether a polygonal or freehand segment is currently being created. If a polygonal segment is being created, a cross cursor is displayed as the cursor 306 on the display 304, as shown in FIG. 9A. If a freehand segment is being created, however, a cursor is displayed which differs in appearance from that which is displayed during creation of a polygonal segment. For example, a pencil cursor is displayed as the cursor 306 on the display 304, as shown in FIG. 9B.

The type of segment is also distinguishable based on the type of line initially drawn as the cursor is moved. For a polygonal segment, only a "rubber band" line is drawn while the cursor is moved. The rubber band line is distinguishable from a normal solid line by virtue of being lighter, broken, or the like. The rubber band line is a straight line, continually erased and redrawn, from the start point to the current cursor location, as shown in FIG. 9A.

For a freehand segment, a solid line is drawn, and continually appended, along the path the cursor is moved, as shown in FIG. 9B. This line is as the freeform segment will appear, and becomes the segment when the segment is completed.

A method and system have been described for creating a freeform drawing object having any desired combination of polygonal and freehand segments. The resulting freeform drawing object can be moved, sized and in some cases filled, as a single graphics data entity. A particular embodiment has been described for performing the method and implementing the system on a conventional computer graphics system having a mouse, a display, a graphics adapter and graphics software capable of plotting straight lines between given coordinates.

In the described embodiment, the user can create the freeform data object solely through mouse input. As a result, mixed polygonal/freehand shapes can be created as independent data objects on graphics systems without keyboards, and on all graphics systems without diverting attention from the mouse and display.

Although the present invention has been described in terms of the above-preferred embodiment, the invention itself is not limited to the embodiment described. Implementations and modifications within the spirit of the invention will be apparent to those of ordinary skill in the art. The scope of the invention itself is defined in the following claims.

I claim:

1. A method in a computer system for determining a line type for each of a plurality of lines to be created, the line type being either freehand or polygonal, the computer system having a mouse with a button, the button having a released position and a depressed position, the method comprising the steps of:

detecting a first change in position of the button;

detecting movement of the mouse; and after detecting movement of the mouse, detecting a second change in position of the button; and after detecting the second change in position of the button,
when the button is in the released position, creating a line having a freehand line type; and
when the button is in the depressed position, creating a line having a polygonal line type.

2. The method of claim 1 wherein each line has a starting point and wherein the step of detecting the first change in position of the button further comprises detecting the starting point.

3. The method of claim 1 wherein each line has an ending point and wherein the step of detecting the second change in position of the button further comprises detecting the ending point.

4. The method of claim 1 wherein the step of creating the line having the freehand line type creates the line to correspond to movement of the mouse.

5. The method of claim 1 wherein the step of creating the line having the polygonal line type creates the line to correspond to movement of the mouse.

6. A method in a computer system for determining a line type for each of a plurality of lines to be created, the computer system having a pointing device with an indicator, the indicator having a first position and a second position, the method comprising the steps of:

detecting a first change in position of the indicator;

detecting movement of the pointing device;

after detecting movement of the pointing device, detecting a second change in position of the indicator; and after detecting the second change in position of the indicator,
when the indicator is in the first position, creating a line having a first line type; and
when the indicator is in the second position, creating a line having a second line type.

7. The method of claim 6 wherein the first position of the indicator is a released position and wherein the first line type is a freehand line type.

8. The method of claim 6 wherein the second position of the indicator is a depressed position and wherein the second line type is a polygonal line type.

9. A method in a computer system for determining a line type for each of a plurality of lines to be created, the line type being either freehand or polygonal, the computer system having a mouse with a button, the button having a depressed position and a released position, the method comprising the computer implemented steps of:

for each of the plurality of lines,
detecting movement of the mouse; and
setting the line type for a line based on the position of the button while the movement of the mouse was detected.

10. The method of claim 9 wherein each line has a starting point and wherein the starting point is indicated by a change in position of the button.

11. The method of claim 9 wherein each line has an ending point and wherein the ending point is indicated by a change in position of the button.

12. A method in a computer system for determining a line type for each of a plurality of lines to be created, the computer system having a pointing device with an indicator, the indicator having a first position and a second position, the method comprising the computer-implemented steps of:

for each of the plurality of line,
detecting movement of the pointing device; and
setting the line type for a line based on the position of the indicator while the movement of the pointing device was detected.

13. The method of claim 12 wherein each line has a starting point and wherein the starting point is indicated by a change in position of the indicator.

14. The method of claim 12 wherein each line has an ending point and wherein the ending point is indicated by a change in position of the indicator.

15. A computer system for determining a line type for each of a plurality of lines to be created, the computer system having a pointing device with an indicator, the indicator having a first position and a second position, the computer system comprising:

means for detecting a first change in position of the indicator;

means for detecting movement of the pointing device;

means for detecting a second change in position of the indicator after detecting movement of the pointing device; and after detecting the second change in position of the indicator,
means for creating a line having a first line type when the indicator is in the first position; and
means for creating a line having a second line type when the indicator is in the second position.

16. The method of claim 15 wherein the first position of the indicator is a released position and wherein the first line type is a freehand line type.

17. The method of claim 15 wherein the second position of the indicator is the depressed position and wherein the second line type is a polygonal line type.

18. A computer system for determining a line type for each of a plurality of lines to be created, the computer system having a pointing device with an indicator, the indicator having a first position and a second position, the computer system comprising:

for each of the plurality of lines,
means for detecting movement of the pointing device; and
means for setting the line type for a line based on the position of the indicator while the movement of the pointing device was detected.

19. The method of claim 18 wherein each line has a starting point and wherein the starting point is indicated by a change in position of the indicator.

20. The method of claim 18 wherein each line has an ending point and wherein the ending point is indicated by a change in position of the indicator.

21. A computer-readable storage medium containing computer instructions that cause a computer system to:

detect a first change in position of an indicator of a pointing device, the indicator having a first position and a second position;

detect movement of the pointing device;

after detecting movement of the pointing device, detect a second change in position of the indicator; and after detecting the second change in position of the indicator,
create a line having a first line type when the indicator is in the first position; and
create a line having a second line type when the indicator is in the second position.

22. The method of claim 21 wherein the first position of the indicator is a released position and wherein the first line type is a freehand line type.

23. The method of claim 21 wherein the second position of the indicator is the depressed position and wherein the second line type is a polygonal line type.

24. A computer-readable storage medium containing computer instructions that cause a computer system to:

for each of a plurality of lines,
    detect movement of a pointing device, the pointing device having an indicator, the indicator having a first position and a second position; and
    set a line type for a line based on the position of the indicator while the movement of the pointing device was detected.

25. The method of claim 24 wherein each line has a starting point and wherein the starting point is indicated by a change in position of the indicator.

26. The method of claim 24 wherein each line has an ending point and wherein the ending point is indicated by a change in position of the indicator.

* * * * *